(12) United States Patent
Whittaker

(10) Patent No.: US 10,379,861 B2
(45) Date of Patent: Aug. 13, 2019

(54) DECODING INSTRUCTIONS THAT ARE MODIFIED BY ONE OR MORE OTHER INSTRUCTIONS

(71) Applicant: MIPS Tech, LLC, Santa Clara, CA (US)

(72) Inventor: James Robert Whittaker, Berkhamsted (GB)

(73) Assignee: MIPS Tech, LLC, Campbell, CA (US)

( * ) Notice: Subject to any disclaimer, the term of this patent is extended or adjusted under 35 U.S.C. 154(b) by 0 days.

(21) Appl. No.: 15/874,724

(22) Filed: Jan. 18, 2018

(65) Prior Publication Data

US 2018/0143835 A1 May 24, 2018

Related U.S. Application Data

(62) Division of application No. 14/722,292, filed on May 27, 2015, now Pat. No. 9,898,293.

(30) Foreign Application Priority Data

May 27, 2014 (GB) .................................. 1409326.4
Jan. 30, 2015 (GB) .................................. 1501619.9
(Continued)

(51) Int. Cl.
*G06F 9/30* (2018.01)
*G06F 9/38* (2018.01)

(52) U.S. Cl.
CPC ...... *G06F 9/30196* (2013.01); *G06F 9/30145* (2013.01); *G06F 9/30149* (2013.01); *G06F 9/30185* (2013.01); *G06F 9/3818* (2013.01)

(58) Field of Classification Search
CPC ............. G06F 9/30181; G06F 9/30185; G06F 9/30196; G06F 8/4441
See application file for complete search history.

(56) References Cited

U.S. PATENT DOCUMENTS 6,167,505 A    12/2000  Kubota et al.
6,970,998 B1   11/2005  Favor
(Continued)

FOREIGN PATENT DOCUMENTS

EP    2270650 A1      1/2011
GB    2486737 A       6/2012
WO    2013081607 A1   6/2013

OTHER PUBLICATIONS

Vo et al., "Enhance up to 40% Performance of SH-4A processor by using Prefix instruction", 2010, IEEE. (Year: 2010).*

*Primary Examiner* — Benjamin P Geib
(74) *Attorney, Agent, or Firm* — Adams Intellex, PLC

(57) ABSTRACT

Methods and apparatus are provided for decoding instructions in a computer program wherein the instructions include one or more base instructions that are subject to modification by one or more other instructions. A decoder determines whether a first received instruction was arrived at by a non-incremental change to a program counter (i.e. a jump in the program). If the first instruction was arrived at by a non-incremental change to the program counter the decoder decodes the immediately preceding instruction to determine if the original instruction is a base instruction subject to modification by one or more other instructions. If the preceding instruction indicates that the original instruction is a base instruction an error has occurred and exception handling code is invoked.

13 Claims, 11 Drawing Sheets

(30) Foreign Application Priority Data

Jan. 30, 2015 (GB) .................................. 1501620.7
Jan. 30, 2015 (GB) .................................. 1501621.5

(56) References Cited

U.S. PATENT DOCUMENTS 9,329,869 B2  5/2016 Gschwind et al.
2004/0039897 A1  2/2004 Kudo

* cited by examiner

DECODING INSTRUCTIONS THAT ARE MODIFIED BY ONE OR MORE OTHER INSTRUCTIONS

BACKGROUND

Computer instruction sets are used to encode the set of operations that a central processing unit (CPU) executes within a program. It is desirable to minimize the amount of memory used to store these instructions. For example, one instruction set may use 32 bits to encode instructions. The use of 32 bits provides for the encoding of a rich instruction set but does not allow more common operations to be encoded using fewer bits. Another instruction set may use 16 bits to encode instructions. The use of 16 bits provides for high code density but limits the number of instructions that can be encoded.

One solution to the limited number of instructions that can be encoded using smaller instructions (e.g. 16 bits) is to allow a previous instruction to modify the meaning of the current instruction. The previous modifying instruction is known as a prefix instruction. In this way, common operations use a single instruction (e.g. 16 bits) whereas less common instructions use two instructions (one prefix instruction and one base instruction with, for example, 32 bits total). This provides a good compromise between code density and richness of instruction.

The embodiments described below are provided by way of example only and are not limiting of implementations which solve any or all of the disadvantages of known computers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and apparatus are provided for decoding instructions in a computer program wherein the instructions comprise one or more base instructions that are subject to modification by one or more other instructions. In an example, a first instruction is received at a decoder. The decoder determines whether the first instruction was arrived at by a non-incremental change to the program counter (i.e. a jump in the program). If the first instruction was arrived at by a non-incremental change to the program counter the decoder decodes the immediately preceding instruction to determine if the original instruction is a base instruction (i.e. an instruction subject to modification by one or more other instructions). If the preceding instruction indicates that the original instruction is a base instruction an error has occurred and exception handling code is invoked.

A first aspect provides a method of decoding instructions of a computer program at a decode unit, the method comprising: receiving a first instruction at the decode unit; determining, at the decode unit, if the first instruction was invoked by a non-incremental change to a program counter; in response to determining the first instruction was invoked by a non-incremental change to the program counter, requesting a second instruction from a fetch unit, the second instruction being an instruction immediately preceding the first instruction in the program; receiving the second instruction at the decode unit from the fetch unit; analyzing the second instruction at the decode unit to determine if the first instruction is a base instruction; and in response to determining the first instruction is a base instruction, invoking exception handling code.

A second aspect provides a method of decoding instructions of a computer program at a decode unit, the method comprising: receiving an instruction at a decode unit, the instruction comprising at least one modifier bit, the modifier bit indicating whether the instruction is a base instruction, a base instruction being an instruction subject to modification by one or more other instructions; analyzing the at least one modifier bit at the decode unit to determine if the received instruction is a base instruction; in response to determining that the received instruction is a base instruction, determining at the decode unit if there are a predetermined number of stored prefix instructions for the base instruction; and in response to determining that there are not the predetermined number of stored prefix instructions for the base instruction, invoking exception handler code.

A third aspect provides a method of decoding instructions in a computer program at a decode unit, the method comprising: receiving a first instruction at the decode unit; requesting at least one additional instruction from a fetch unit, each of the at least one additional instruction following the first instruction in the program; receiving the at least one additional instruction at the decode unit, the at least one additional instruction comprising a first additional instruction; determining if the first additional instruction is a postfix instruction, a postfix instruction being an instruction that modifies a preceding instruction; in response to determining the first additional instruction is a postfix instruction, modifying the first instruction at the decode unit using the first additional instruction; and in response to determining the first additional instruction is not a postfix instruction, providing the first instruction and the at last one additional instruction to an execute unit for execution.

A fourth aspect provides a data processing apparatus arranged to execute a computer program, the data processing apparatus comprising: a program memory configured to store the computer program, the computer program comprising a plurality of instructions; a program counter configured to identify a first instruction in the program memory; a fetch unit configured to retrieve the first instruction in the program memory identified by the program counter; and a decode unit configured to: receive the first instruction from the fetch unit; determine if the first instruction was invoked by a non-incremental change to the program counter; in response to determining the first instruction was invoked by a non-incremental change to the program counter, request a second instruction from the fetch unit, the second instruction being an instruction immediately preceding the first instruction in the program memory; receive the second instruction from the fetch unit; analyze the second instruction to determine if the first instruction is a base instruction, a base instruction being an instruction subject to modification by at least one other instruction; and in response to determining the first instruction is a base instruction, invoking exception handling code.

A fifth aspect provides a data processing apparatus arranged to execute a computer program, the data processing apparatus comprising: a program memory configured to store the computer program, the computer program comprising a plurality of instructions; a program counter configured to identify an instruction in the program memory; a fetch unit configured to retrieve the instruction from the program memory identified by the program counter; and a decode unit configured to: receive the instruction from the fetch unit, the instruction comprising at least one modifier bit, the modifier bit indicating whether the instruction is a base instruction, a base instruction being an instruction subject to modification by at least one other instruction; and analyze the at least one modifier bit at the decode unit to determine if the received instruction is a base instruction; in response to determining the received instruction is a base instruction, determine if there are a predetermined number of stored prefix instructions for the base instruction; and in response to determining there are not the predetermined number of stored prefix instruction for the base instruction, invoke exception handler code.

A sixth aspect provides a data processing apparatus arranged to execute a computer program, the data processing apparatus comprising: a program memory configured to store the computer program, the computer program comprising a plurality of instructions; a program counter configured to indicate a first instruction in the program memory; a fetch unit configured to retrieve the first instruction from the program memory as indicated by the program counter; and a decode unit configured to: receive the first instruction from the fetch unit; request at least one additional instruction from the fetch unit, each of the at least one additional instruction following the first instruction in the program memory; receive the at least one additional instruction, the at least one additional instruction comprising a first additional instruction; determine if the first additional instruction is a postfix instruction, a postfix instruction being an instruction that modifies a preceding instruction; in response to determining the first additional instruction is a postfix instruction, modify the first instruction using the first postfix instruction; and in response to determining the first additional instruction is not a postfix instruction, provide the first instruction and the at least one additional instruction to an execute unit for execution.

A seventh aspect provides a compiler to store a plurality of instructions in a program memory, the compiler comprising a processor configure to: receive the plurality of instructions, the plurality of instructions comprising one or more base instructions and at least one corresponding modifier for each base instruction; analyze the plurality of instructions to identify each base instruction and its at least one corresponding modifier; and store each base instruction and its corresponding at least one modifier in the program memory so that each base instruction and its corresponding modifiers are on the same side of a boundary within the program memory.

An eighth aspect provides a computer readable storage medium having encoded thereon computer readable program code for generating the data processing apparatus of the fourth aspect.

A ninth aspect provides a computer readable storage medium having encoded thereon computer readable program code for generating a data processing apparatus configured to perform the method of the first aspect.

A tenth aspect provides a computer readable storage medium having encoded thereon computer readable program code for generating the data processing apparatus of the fifth aspect.

An eleventh aspect provides a computer readable storage medium having encoded thereon computer readable program code for generating a data processing apparatus configured to perform the method of the second aspect.

A twelfth aspect provides a computer readable storage medium having encoded thereon computer readable program code for generating the data processing apparatus of the sixth aspect.

A thirteenth aspect provides a computer readable storage medium having encoded thereon computer readable program code for generating a data processing apparatus configured to perform the method of the third aspect.

A fourteenth aspect provides a method to decode instructions substantially as described with reference to FIG. 3.

A fifteenth aspect provides a method to decode instructions substantially as described with reference to FIG. 5.

A sixteenth aspect provides a method to decode instructions substantially as described with reference to FIG. 8.

A seventeenth aspect provides a method to decode instructions substantially as described with reference to FIG. 10.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
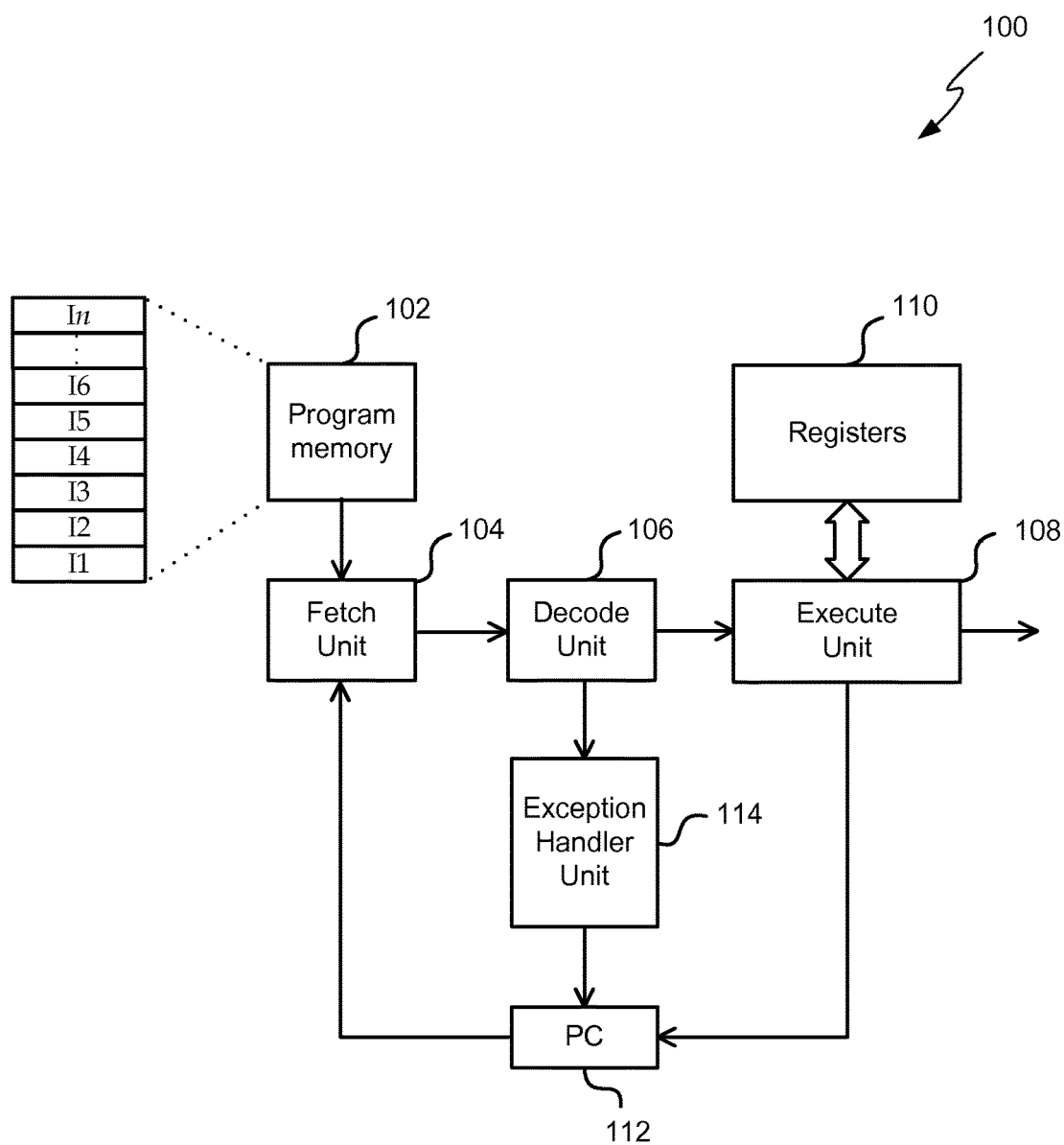
FIG. 1 is a schematic diagram of an example data processing apparatus.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

One problem with the prefix instruction approach described above is that there exists the possibility of ambiguity in the program code. If a machine (or an observer) starts reading from an arbitrary point, it is not apparent whether the instruction at that point should be subject to modification from a previous prefix instruction. The widespread use of computed branches or branch instructions in program code offers the possibility that code execution could commence at any offset into the code. This ambiguity therefore means that the effect of the program code becomes very difficult to predict. This could lead to unexpected errors or possible methods to attack code used in secure applications.

For example, if a branch erroneously jumps to an instruction that should be modified by a prefix, the program will continue from this point without the instruction being modified. The unpredictable nature of this can be catastrophic to the program operation. The program may continue running for some time reading further instructions and generating outputs until something happens that causes an error or halt in the program. This makes debugging this type of error difficult, as the source of the error is the branch to the prefixed instruction that may have occurred some time ago.

In the case of security or safety-critical applications, then it is important to know rapidly that something has gone wrong in the program, so that the error can be contained. In the case of a branch to a prefixed instruction, the error can take some time to manifest itself, leading to an uncertain period in which the program operation is unpredictable. This would potentially be very damaging in the case of a program controlling a nuclear power plant or a banking system, for example.

This type of error can also occur in situations other than an illegal branch. For example, in the case of space applications, such as satellites, one or more bits within a CPU can be flipped by a high-energy particle (i.e. from cosmic rays) passing through the spacecraft. If an instruction address is subject to such a bit-flip, then the instruction fetched is not the one intended.

Any change to the program counter other than an increment to the next instruction will be referred to herein as a "jump" in the program. As described above, jumps may be caused, for example, by a branch in the program or external factors, such as high-energy particles passing through the computer. An "illegal jump" is a jump which takes the program to an instruction that cannot be legally executed. For example, a branch instruction which takes the program directly to a prefixed base instruction causes an illegal jump since the base instruction cannot be legally executed without its prefix(es). An "illegal branch" is a branch instruction which causes an illegal jump.

Embodiments described herein relate to methods and data processing apparatus for decoding instructions that comprise base instructions, which allow illegal jumps to base instructions to be easily identified. In a first embodiment, one or more bits of an instruction are used to indicate whether the current instruction is subject to modification by another instruction. In a second embodiment, both the current instruction and the previous instruction are fetched and decoded to determine if the current instruction is subject to modification by the previous instruction. In a third embodiment, instructions are modified by a postfix instruction (i.e. an instruction following the current instruction) instead of by a prefix instruction (i.e. an instruction preceding the current instruction) and both the current instruction and the following instruction are fetched and decoded to determine if the current instruction is subject to modification by the following instruction. In a fourth embodiment, instructions are modified by a postfix instruction and one or more bits of an instruction are used to indicate whether the current instruction is subject to modification by another instruction.

An instruction that is subject to modification by another instruction will be referred to herein as a "base instruction" and an instruction that modifies a subsequent instruction will be referred to herein as a "prefix instruction".

Reference is now made to FIG. 1 which illustrates a data processing unit 100, such as a processor, that executes a computer program.

The data processing unit 100 comprises a program memory 102 configured to store a sequence of instructions forming the computer program. In the example, shown in FIG. 1, the instructions are denoted I1 to In.

The data processing unit 100 further comprises a fetch unit 104 configured to fetch instructions from the program memory 102 (in program order) as indicated by a program counter (PC) 112 and a decode unit 106 arranged to interpret the instructions. If there is no error or exception in decoding the instruction then the decode unit 106 forwards the instruction to an execute unit 108 for execution (which may include reading and/or writing to one or more registers 110) and updates the program counter 112 to point to the next instruction.

If, however, there is an error in decoding the instruction (e.g. the instruction is invalid) then the decode unit 106 notifies an exception handler unit 114 which updates the program counter 112 so that the fetch unit 104 fetches exception handling code from the program memory 102. In this way, the exception can be handled predictably, without causing the data processing unit 100 to execute invalid code.

If prefix modifiers are used, then there may be situations where the program counter 112 is updated to point to an instruction that is to be modified by a prefix (i.e. a base instruction). For example, in the case of an illegal branch instruction the target base instruction will be fetched, decoded and executed unmodified, which will cause the program to operate unpredictably. The decode unit 106 will not detect that the instruction should have been prefixed and hence will not call the exception handler unit 114.

Accordingly, there is a need for the decode unit 106 to be able to identify base instructions so that it can call the exception handler unit 114 when an illegal jump to a base instruction has occurred. Described below are methods for decoding instructions that may be implemented by the decode unit 106 which allows the decode unit 106 to identify base instructions.

One or more of the functions performed by the units (e.g. fetch unit 104, decode unit 106, and the execute unit 108) of FIG. 1 may be performed in parallel, for example, via pipelining.

Figure 2:
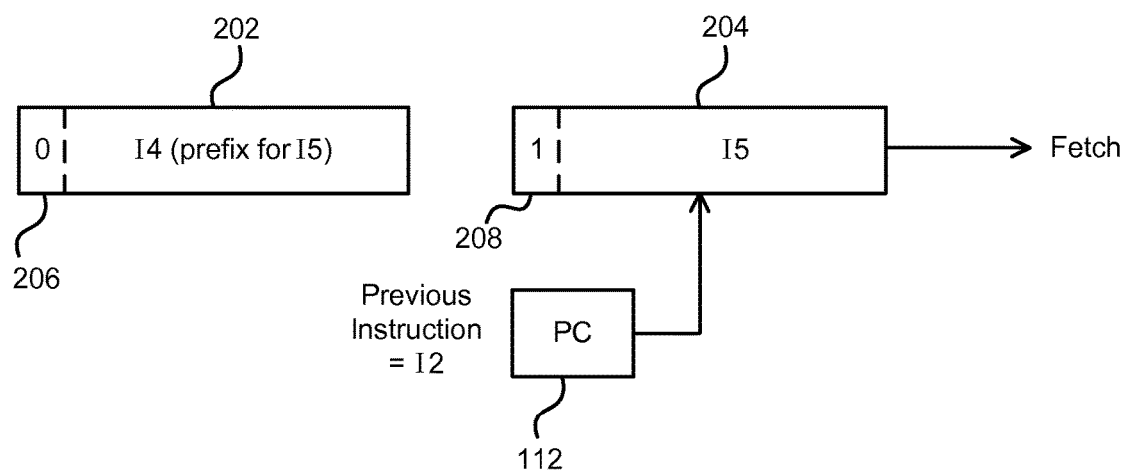
FIG. 2 shows an example of a method of decoding instructions in accordance with a first embodiment.
Figure 3:
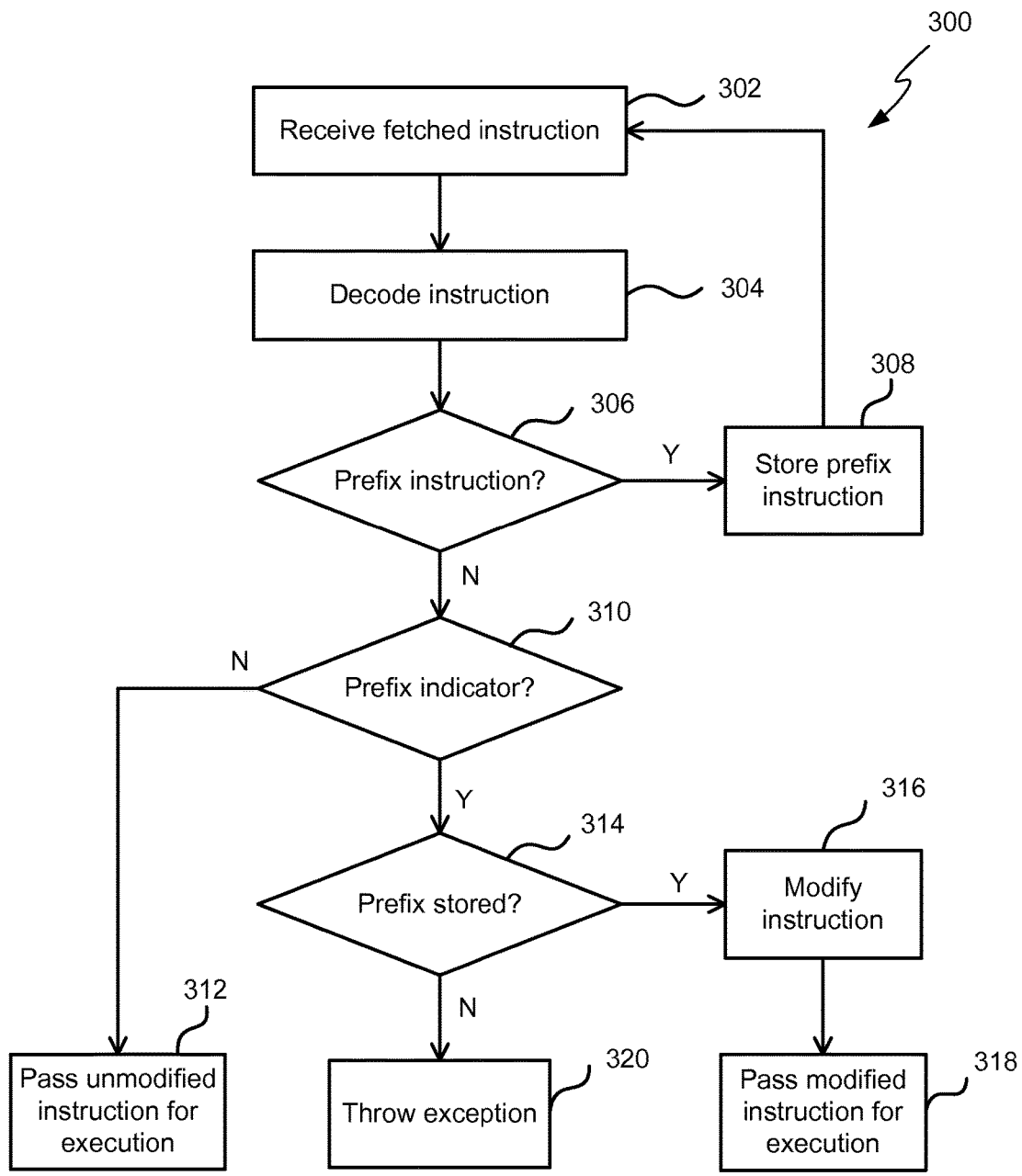
FIG. 3 is a flowchart of the method of FIG. 2.

Reference is now made to FIGS. 2 and 3 which illustrate a first embodiment of a method for decoding instructions. In this embodiment, one or more bits of the instruction are used to indicate whether there is at least one modifier for the current instruction (e.g. whether there is a prefix instruction).

FIG. 2 illustrates an example of the first embodiment. Specifically, FIG. 2 illustrates two instructions 202 and 204. The first instruction 202 corresponds to I4 of FIG. 1 and the second instruction 204 corresponds to I5 of FIG. 1 where I4 is the prefix for I5. Each instruction 202 and 204 has a reserved bit 206 and 208, referred to as the modifier bit, for indicating whether the instruction is subject to modification by another instruction (i.e. that there is a prefix instruction for the instruction). In this example, since I5 is to be modified by I4, the modifier bit 208 for I5 is set to one to indicate that I5 is to be modified by another instruction. Since I4 is the prefix to be used to modify I5, the modifier bit 206 is set to zero to indicate that I4 is not itself to be modified by another instruction.

When the decode unit 106 decodes an instruction it checks the modifier bit 206 or 208 of the instruction 202 or 204 to determine whether the instruction is to be modified by another instruction (i.e. whether the instruction is a base instruction). If the modifier bit 206 or 208 indicates that the instruction 202 or 204 is to be modified and the decode unit 106 has not decoded the modifier instruction (e.g. the prefix instruction) then the decode unit 106 detects an error (e.g. an illegal branch) and invokes the exception handler unit 114.

The exception handler unit 114 then updates the program counter 112 so that the fetch unit 104 fetches exception handling code from the program memory 102. In some cases the exception handler unit 114 may also save the state and/or flush an associated pipeline.

For example, as shown in FIG. 2, if the previous instruction was I2 (a branch instruction) which caused the program counter 112 to be updated to point to I5, the decode unit 106 would decode I5 and check the modifier bit 208. Since the modifier bit 208 for I5 is set to one indicating the instruction is to be modified and the previous instruction (I2) was not a prefix instruction, the decode unit 106 knows an error has occurred and calls the exception handler unit 114.

Although, in FIG. 2, the modifier bit 206 or 208 is shown as the most significant bit of the instruction 202 or 204, it could be located at any predetermined position. Furthermore, although, in FIG. 2, there is single modifier bit 206 or 208, in other cases there may be more than one modifier bit. This may be used, for example, in cases where instructions can be modified by more than one modifier instruction to indicate the number of modifier instructions. This would allow the decode unit 106 to not only catch illegal jumps (e.g. illegal branch instructions) to instructions that should be modified, but also catch illegal jumps to instructions that are not the first modifier instructions (e.g. the first prefix instruction).

Using one or more bits of the instruction to indicate whether the instruction is subject to modification by one or more other instructions (i.e. the instruction is a base instruction) allows illegal jumps (e.g. illegal branch instructions) to base instructions to be quickly and easily identified. The trade-off, however, is that reserving one or more of the bits of the instruction for this purpose reduces the number of bits available for encoding instructions and thus reduces the number of different types of instructions that can be encoded in a single instruction.

FIG. 3 is a flowchart of an example method 300 in accordance with the first embodiment which may be executed by a decode unit (e.g. decode unit 106). At step 302 the decode unit 106 receives an instruction fetched by the fetch unit 104. The instruction comprises at least one modifier bit. As described above the modifier bit indicates whether the instruction is a base instruction subject to modification by at one or more other instructions and, optionally, how many modifier instructions there are. Once the fetched instruction has been received the method 300 proceeds to step 304.

At step 304, the decode unit 106 decodes the fetched instruction to identify particular bit patterns in the fetched instruction. Once the fetched instruction is decoded the method 300 proceeds to step 306.

At step 306, the decode unit 106 determines whether the decoded instruction is a prefix for another instruction. Determining whether the decoded instruction is a prefix for another instruction may comprise comparing the instruction to one or more predetermined bit patterns to determine if there is a match. As it known to those of skill in the art an instruction may comprises an opcode (operation code) which specifies the operation to be performed. In some cases there is a special opcode for prefix instructions. Accordingly, determining whether the instruction is a prefix for another instruction may comprise reading the instruction's opcode.

If the decoded instruction is determined to be a prefix then the instruction is stored at step 308 so that it can be used to modify a subsequent base instruction. In some cases the prefix instruction may be stored in a local storage unit, such as memory or registers, of the decode unit 106 or the fetch unit 104. The amount of data stored for each prefix instruction may be reduced by only storing enough information to allow the base instruction to be modified. For example the full 16 bits of a 16 bit instruction may not be stored. In some cases, instead of storing the prefix instruction the prefix instruction may be discarded and re-fetched after decoding a base instruction.

Once the prefix instruction is stored the method 300 proceeds back to step 302. If, however, it is determined that the decoded instruction is not a prefix, then the method 300 proceeds to step 310.

At step 310, the decode unit 106 determines whether the decoded instruction is a base instruction (i.e. that it is subject to modification by another instruction). Determining whether the decoded instruction is a base instruction comprises analyzing the modifier bit(s) to determine if they indicate that the instruction is subject to modification. As described above, the modifier bit(s) are one or more reserved bits in the instruction that are used to indicate whether the instruction is subject to modification by one or more other instructions and, optionally, how many modifier instructions there are.

If the modifier bit(s) indicate that the instruction is not subject to modification then at step 312 the decode unit 106 passes the unmodified instruction (i.e. the instruction decoded in step 304) to the execute unit 108 for execution. If, however, the modifier bit(s) indicate that the instruction is subject to modification by one or more other instructions (i.e. that the instruction is a base instruction) then the method proceeds to step 314.

At step 314, the decode unit 106 determines whether there are a predetermined number of stored prefix instructions for the base instruction. A stored prefix instruction is a prefix instruction that has been previously decoded and stored by the decode unit as per steps 306 and 308.

In cases where there is only a single modifier bit then the predetermined number may be one (i.e. the decode unit 106 checks to see if there is a stored prefix for the base instruction). In cases where there is more than one modifier bit indicating the number of modifiers then the decode unit 106 may analyze the modifier bits to determine the number of prefix instructions for the base instruction. In these cases the predetermined number is the number of prefix instructions specified in the modifier bits. For example, if the modifier bits indicate there are two prefix modifiers for the base instruction then the predetermined number is two and the decode unit 106 determines if it has two stored prefix instructions for the base instruction.

If there are the predetermined number of stored prefix instructions for the base instruction then in step 316 the decode unit 106 uses the stored prefix instruction(s) to modify the received instruction (i.e. the instruction received in step 302). For example, a MOV instruction (an instruction that copies data from one location to another), when unmodified, may use a 16 bit operand or address. If the MOV instruction was preceded by a prefix instruction then the MOV instruction may be modified to use 32 bit operations or addresses instead. In step 318 the modified instruction is provided to the execute unit 108 for execution.

If, however, there are not the predetermined number of stored prefix instructions (i.e. there are no stored prefix instructions or less stored prefix instructions than specified in the modifier bits) then an error has occurred (e.g. an illegal branch instruction has occurred) and at step 320, the decode unit 106 invokes the exception handler unit 114.

Figure 4:
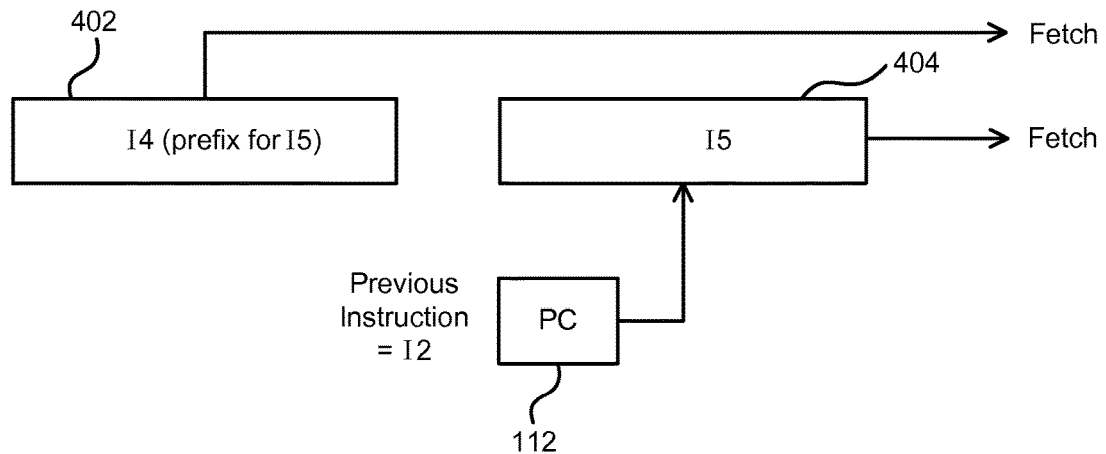
FIG. 4 shows an example of a method of decoding instructions in accordance with a second embodiment.
Figure 5:
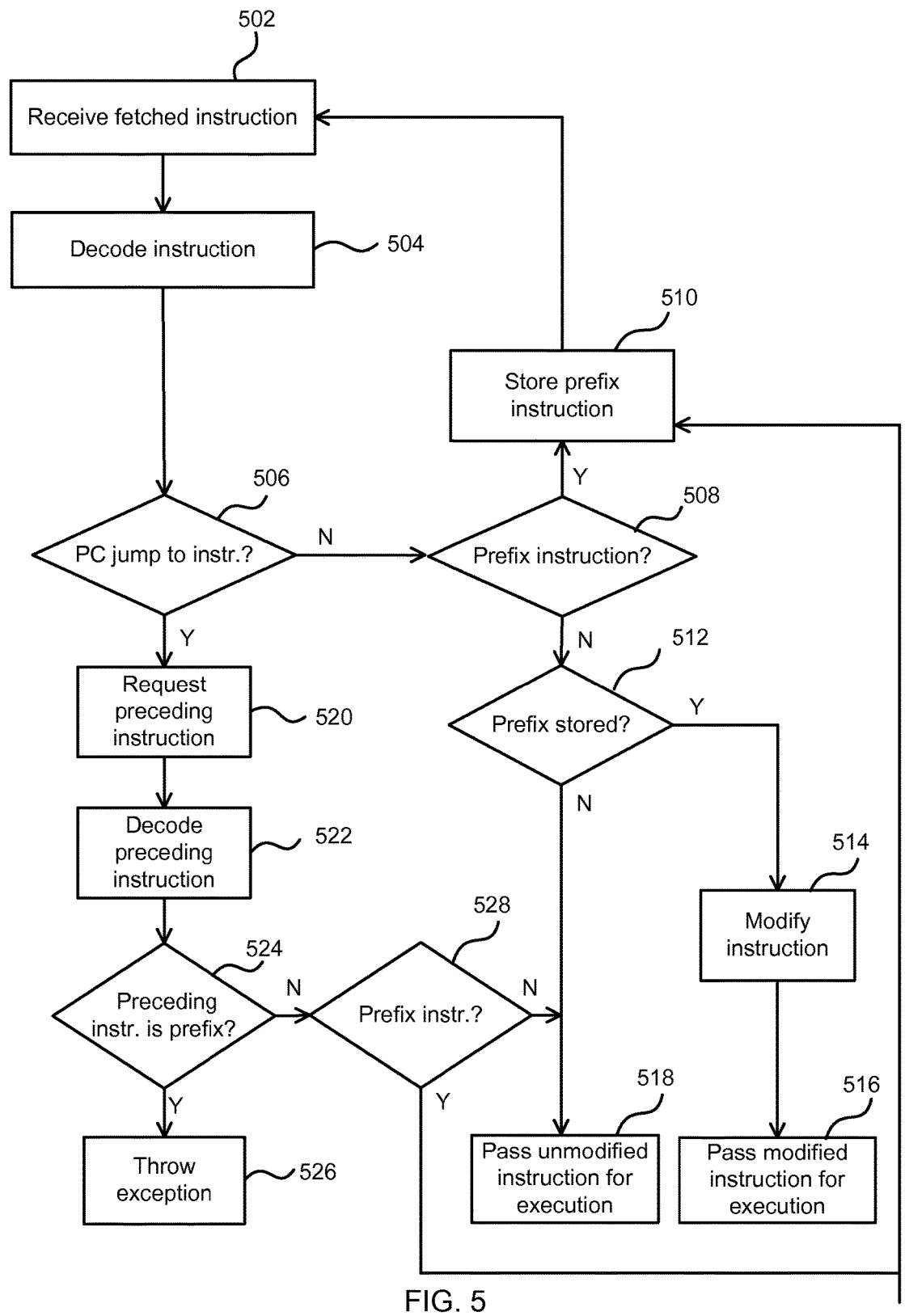
FIG. 5 is a flowchart of the method of FIG. 4.

Reference is now made to FIGS. 4 and 5 which illustrate a second embodiment of a method for decoding instructions.

In this embodiment the current instruction and the preceding instruction (i.e. the instruction immediately preceding the current instruction in the program code) are both fetched and decoded to determine if the current instruction is subject to modification by the preceding instruction. While more than one preceding instruction may be fetched, the decoder can determine the current instruction is a base instruction from only the immediately preceding instruction.

FIG. 4 illustrates an example of the second embodiment. Specifically, FIG. 4 illustrates two instructions 402 and 404. The first instruction 402 corresponds to I4 of FIG. 1 and the second instruction 404 corresponds to I5 of FIG. 1 where I4 is the prefix for I5. If the previous instruction was I2 (a branch instruction) which caused the program counter 112 to be updated to point to I5, then both I5 and I4 are fetched and decoded. I4 will be identified to be the prefix for I5. This indicates an error has occurred (e.g. an illegal branch) and the exception handler unit 114 is called.

In some cases, both the current instruction and the preceding instruction are only fetched and decoded after a jump in the program (i.e. a change to the program counter other than an increment to the next instruction, e.g. a change to the program counter 112 caused by a branch instruction). Where there is a simple increment of the program counter to the next instruction only the current instruction is fetched and decoded. In these cases resources are not wasted fetching the preceding instruction again since it will have already been fetched and decoded in the previous cycle.

Fetching and decoding both the current and preceding instructions allows illegal jumps (e.g. illegal branch instructions) to base instructions to be quickly and easily identified. The trade-off is the delay caused by fetching the preceding instruction after a branch. However, this is mitigated significantly by the fact that many processors are now highly parallel, which means that many instructions are generally issued at the same time, reducing the impact of waiting for the previous instruction.

FIG. 5 is a flowchart of an example method 500 in accordance with the second embodiment which may be executed by a decode unit (e.g. decode unit 106). At step 502 the decode unit 106 receives a first instruction fetched by the fetch unit 104. Once the fetched instruction has been received the method 500 proceeds to step 504.

At step 504, the decode unit 106 decodes the first instruction to identify particular bit patterns in the first instruction. Once the first instruction has been decoded the method 500 proceeds to step 506.

At step 506, the decode unit 106 determines whether the first instruction is an instruction that was invoked (i.e. arrived at) by a jump in the program. As described above, a jump in the program is any change to the program counter other than an increment to the next instruction (i.e. a non-incremental change to the program counter). In some cases the execute unit 108 may be configured to send an indication or a signal to the decode unit 106 if it makes a change to the program counter other than an increment to the next instruction. In these cases the decode unit 106 may determine that the first instruction was invoked by a jump in the program when it receives such an indication or signal from the execute unit 108. In other cases the program counter 112 itself may comprise hardware that monitors changes and provides an indication or a signal to the decode unit 106 if it detects a non-incremental change. In these cases when the decode unit 106 receives such an indication or signal from the program counter 112 it can relate this signal to a future instruction it will receive (e.g. it will know how many cycles it will be until it gets the instruction the indication or signal relates to). Then when the decode unit 106 subsequently receives that instruction for decoding the decode unit 106 will know that the instruction was invoked by a jump in the program.

If the decode unit 106 determines that the first instruction was not invoked by a jump in the program then the method 500 proceeds to step 508. If, however, the decode unit 106 determines that the first instruction was invoked by a jump in the program then the method 500 proceeds to step 520.

At step 508, the decode unit 106 determines whether the first instruction is a prefix for another instruction. Determining whether the first instruction is a prefix for another instruction may comprise comparing the first instruction to one or more predetermined bit patterns to determine if there is a match. For example, as described above, determining whether an instruction is a prefix for another instruction may comprises analyzing the opcode of the instruction. If the first instruction is determined to be a prefix then the instruction is stored at step 510 so that it can be used later to modify a subsequent base instruction. The method 500 then proceeds back to step 502. If, however, it is determined that the first instruction is not a prefix, then the method 500 proceeds to step 512.

At step 512 the decode unit 106 determines whether there is at least one stored prefix for the first instruction. If there is at least one prefix stored for the first instruction then in step 514 the decode unit 106 uses the stored prefix instruction(s) to modify the first instruction (i.e. the instruction received in step 502) and in step 516 passes the modified first instruction to the execute unit 108 for execution. If, however, there are no prefixes stored for the first instruction, then the decode unit 106 passes the unmodified first instruction (i.e. the instruction decoded in step 504) to the execution unit 108 for execution at step 518.

At step 520, the decode unit 106 requests a second instruction from the fetch unit 104. The second instruction is the instruction immediately preceding the first instruction in the program (i.e. the instruction located at the program counter value for the first instruction minus one instruction). At step 522 the decode unit 106 receives and decodes the second instruction. At step 524 the decode unit 106 determines whether the second instruction is a prefix. If the decode unit 106 determines that the second instruction is a prefix then an error has occurred (e.g. an illegal branch instruction has occurred) and at step 526 the decode unit 106 invokes the exception handler unit 114.

If, however, the decode unit 106 determines that the second instruction is not a prefix then in step 528 the decode unit 106 determines whether the first instruction is a prefix instruction. If the decode unit 106 determines that the first instruction is a prefix then at step 510 the prefix instruction is stored for further use. If, however, the decode unit 106 determines that the first instruction is not a prefix instruction then at step 518 the unmodified first instruction is passed to the execute unit 108 for execution.

Figure 6:
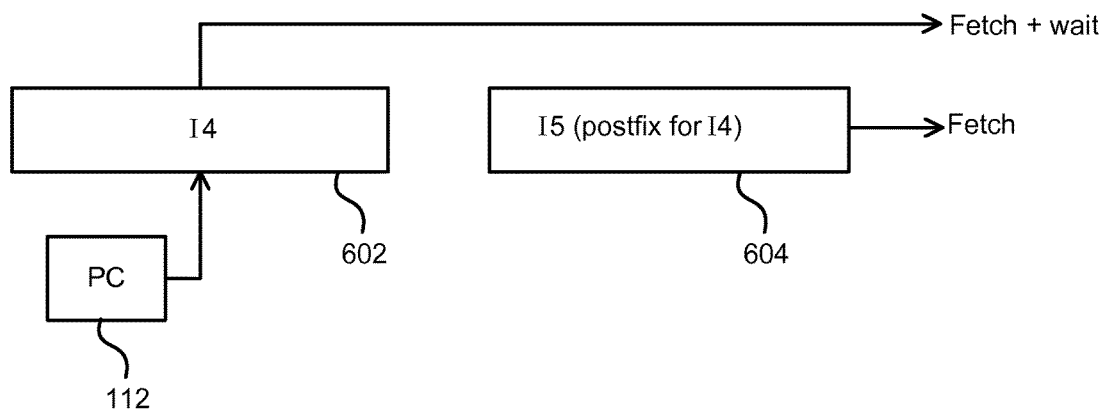
FIG. 6 shows an example of a method of decoding instructions in accordance with a third embodiment.
Figure 7:
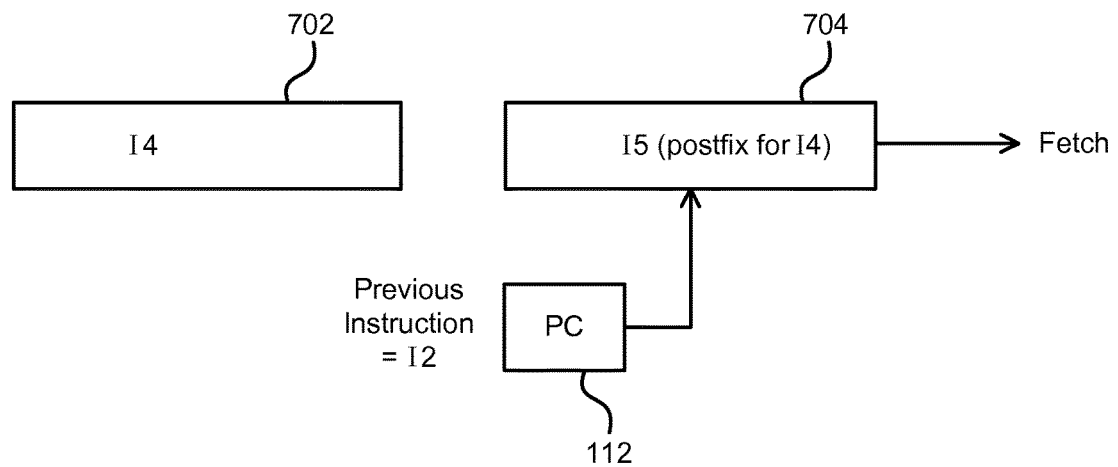
FIG. 7 shows a second example of the method of FIG. 6.
Figure 8:
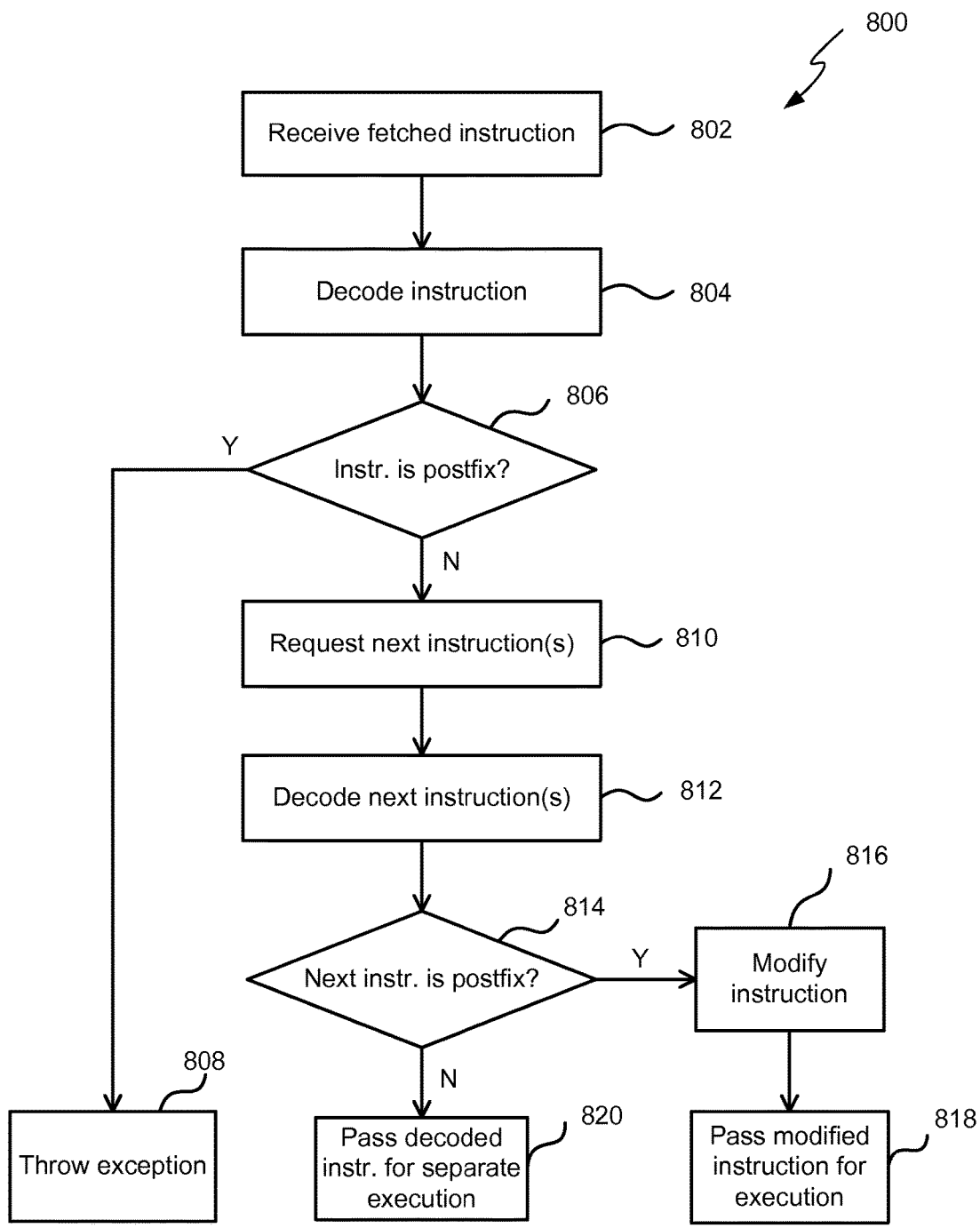
FIG. 8 is a flowchart of the method of FIGS. 6 and 7.

Reference is now made to FIGS. 6 to 8 which illustrate a third embodiment of a method for decoding instructions. In this embodiment, instead of instructions being modified by a prefix, they are modified by a postfix and both the current instruction and the following instruction are fetched and decoded to determine if the current instruction is subject to modification by the following instruction. In other words, instead, of instructions being modified by one or more preceding instructions, instructions are modified by one or more following instructions. Postfix modifiers were not feasible in the past because of the delay caused by waiting for the fetch and decode of the following instruction before the current instruction is sent for execution. However, because modern multiple-issue processors have multiple instructions under consideration at the same time, the efficiency loss due to having to check for postfixes is minimized.

FIG. 6 illustrates a first example of the third embodiment where a base instruction is modified by a following instruction (i.e. a postfix instruction). Specifically, FIG. 6 illustrates two instructions 602 and 604. The first instruction 602 corresponds to I4 of FIG. 1 and the second instruction 604 corresponds to I5 of FIG. 1 where I5 is the postfix for I4. In this example, when I4 is fetched and decoded the decode unit 106 waits until I5 is fetched and decoded to determine whether I4 is subject to modification.

FIG. 7 illustrates a second example of the third embodiment where an illegal branch instruction occurs. Specifically, FIG. 7 illustrates two instructions 702 and 704. The first instruction 702 corresponds to I4 of FIG. 1 and the second instruction 704 corresponds to I5 of FIG. 1 where I5 is the postfix for I4. In this example, the previous instruction I2 was a branch instruction that caused the program counter 112 to point to I5. When I5 is decoded it will be determined that I5 is a postfix for an earlier instruction. Since a postfix cannot validly follow a branch instruction the decode unit 106 will know an error has occurred and will invoke the exception handler unit 114.

FIG. 8 is a flowchart of an example method 800 in accordance with the third embodiment which may be executed by a decode unit (e.g. decode unit 106). At step 802 the decode unit 106 receives a first instruction fetched by the fetch unit 104. Once the first instruction has been received the method 800 proceeds to step 804.

At step 804, the decode unit 106 decodes the first instruction to identify particular bit patterns in the fetched instruction. Once the first instruction has been decoded the method 800 proceeds to step 806.

At step 806, the decode unit 106 determines whether the first instruction is a postfix for another instruction. Determining whether the decoded instruction is a postfix for another instruction may comprise comparing the instruction to one or more predetermined bit patterns to determine if there is a match. As described above, instructions may comprise an opcode that describes what operation is to be performed by the instruction. Postfix instructions may be assigned a special opcode which allows them to be identified as postfix instructions by their opcode. This is in contrast to base instructions which cannot typically be identified as base instructions from their opcode alone. For example, a MOV instruction has a MOV opcode. It is only with additional information (e.g. subsequently decoding a postfix instruction) that the decoder knows that the MOV instruction is a base instruction subject to modification by another instruction.

If the first instruction is determined to be a postfix then an error has occurred and at step 808 the decode unit 106 invokes the exception handler unit 114. If, however, it is determined that the first instruction is not a postfix then the method 800 proceeds to step 810.

At step 810, the decode unit 106 requests one or more additional instructions from the fetch unit 104. The additional instructions immediately follow the first instruction in the program. In cases where there may only be a single postfix instruction for any base instruction then the decode unit 106 may only fetch one additional instruction (i.e. the instruction immediately following the first instruction). In cases, however, where there may be more than one postfix instruction for any base instruction then the decode unit 106 may request multiple additional instructions (e.g. the two instructions immediately following the first instruction). In some cases the maximum number of modifiers is hardcoded in the decode unit 106 based on the instruction set used. In these cases the decode unit 106 may use this hardcoded information to determine how many additional instructions to request. For example, if the decode unit 106 is hardcoded with information specifying that the maximum number of modifiers is three then the decode unit 106 may request three additional instructions. Once the additional instructions have been requested, the method 800 proceeds to step 812.

At step 812, the decode unit 106 receives and decodes the additional instructions. Once the additional instructions have been received and decoded, the method 800 proceeds to step 814.

At step 814, the decode unit 106 determines whether the first additional instruction (i.e. the instruction immediately following the first instruction) is a postfix. Determining whether an additional instruction is a postfix may comprise comparing the instruction to one or more predetermined bit patterns to determine if there is a match. For example, the decode unit 106 may determine an additional instruction is a postfix instruction by analyzing the opcode of the instruction. If the first additional instruction is a postfix then the method 800 proceeds to step 816. If, however, it is determined that the first additional instruction is not a postfix then at step 820 the decode unit 106 provides both the first instruction and the additional instructions, unmodified, to the execute unit 108 for execution.

At step 816, any additional instructions that are postfix instructions are used to modify the first instruction (i.e. the instruction received in step 802). For example, if three additional instructions are requested and the first two additional instructions are identified as postfix instructions then the two postfix instructions are used to modify the first instruction. Once the first instruction has been modified then in step 818 the decode unit 106 forwards the modified first instruction and any non-postfix additional instructions to the execute unit 108 for execution.

Figure 9:
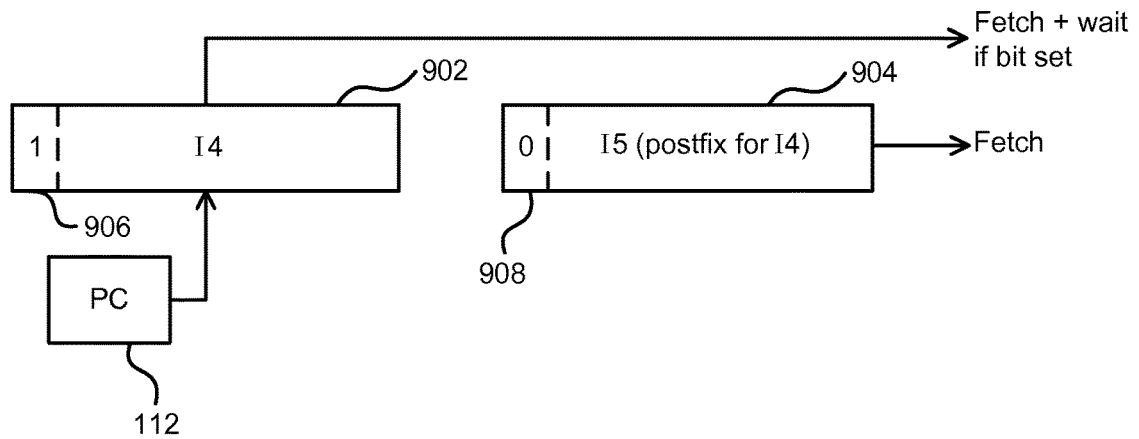
FIG. 9 shows an example of a method of decoding instructions in accordance with a fourth embodiment.
Figure 10:
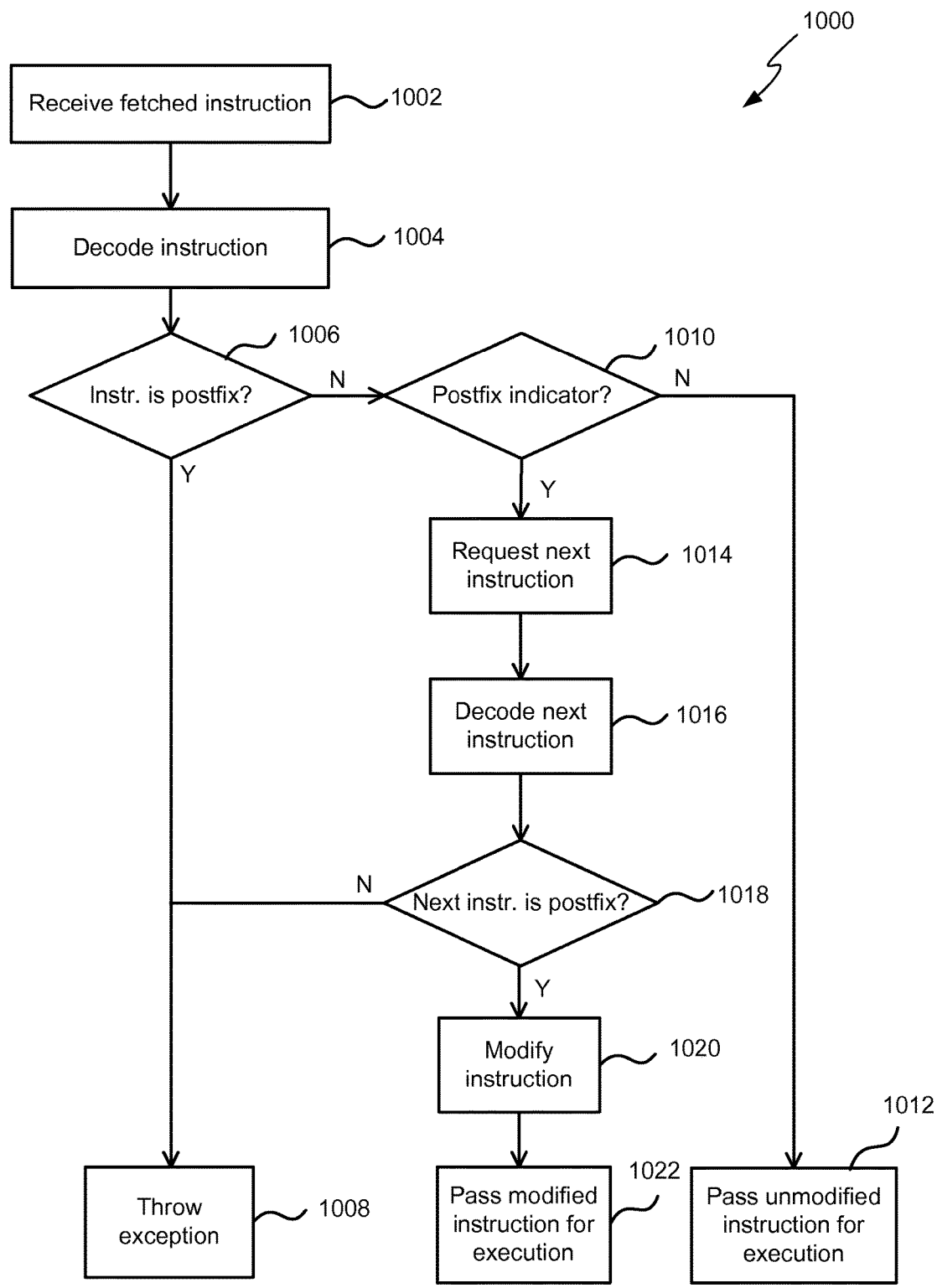
FIG. 10 is a flowchart of the method of FIG. 9.

Reference is now made to FIGS. 9 and 10 which illustrate a fourth embodiment of a method for decoding instructions. This embodiment is a combination of the first and third embodiments. In particular, instructions are modified by postfixes (e.g. subsequent instructions) instead of prefixes (i.e. preceding instructions) and one or more bits of each instruction is reserved for indicating whether the instruction is subject to modification by one or more other instructions.

FIG. 9 illustrates an example of the fourth embodiment. Specifically, FIG. 9 illustrates two instructions 902 and 904. The first instruction 902 corresponds to I4 of FIG. 1 and the second instruction 904 corresponds to I5 of FIG. 1 where I5 is the postfix for I4. As described with respect to FIG. 6, when I4 is fetched and decoded the decode unit 106 waits until I5 is fetched and decoded to determine whether I4 should be modified. Each instruction also has a reserved bit 906 or 908, referred to as the modifier bit, for indicating whether or not the instruction is subject to modification by another instruction. In this example, since I4 is to be modified by I5, the modifier bit 906 for I4 is set to one to indicate that I4 is subject to modification by another instruction. Similarly since I5 is the postfix to be used to modify I4, the modifier bit 908 is set to zero to indicate that I5 is not itself subject to modification.

When the decode unit 106 decodes an instruction 902 or 904 it checks the modifier bit 906 or 908 to determine whether the instruction is subject to modification (e.g. it is a base instruction). If the modifier bit 906 or 908 indicates that the instruction 902 or 904 is subject to modification then the decode unit 106 knows it should wait for the next instruction to be fetched and decoded before proceeding. If, however, the modifier bit 906 or 908 indicates that the instruction is not subject to modification then the instruction 906 or 908 can be immediately sent to the execute unit 108 for execution without having to wait for the next instruction to be fetched and decoded. For example, when the decode unit 106 decodes I4 the modifier bit 906 tells the decode unit 106 to wait and fetch and decode I5 so that it can be used to modify I4.

Although, in FIG. 9, the modifier bit 906 or 908 is shown as the most significant bit, it could be located at any predetermined position. Furthermore, although, in FIG. 9, there is a single modifier bit 906 or 908, in other cases there may be more than one modifier bit. This may be used, for example, in cases where instructions can be modified by more than one modifier to indicate the number of modifiers. This tells the decode unit 106 how many instructions should be fetched and decoded before the current instruction is dispatched to the execute unit 108.

Not only can the modifier bit 906 or 908 be used to tell the decode unit 106 when it should wait for the next instruction, it can also be used to identify errors in the scenario where a postfix modifier is supposed to be present, but the next instruction is not a valid modifier. For example, if the modifier bit 906 or 908 indicates that the instruction is subject to modification but the next instruction is not a valid modifier then the decode unit 106 knows an error has occurred and can invoke the exception handler unit 114.

FIG. 10 is a flowchart of an example method 1000 in accordance with the fourth embodiment which may be executed by a decode unit (e.g. decode unit 106). At step 1002 the decode unit 106 receives a first instruction fetched by the fetch unit 104. The first instruction comprises at least one modifier bit indicating whether the first instruction is a base instruction, and, optionally, how many modifiers there are for the first instruction. Once the first instruction has been received the method 1000 proceeds to step 1004.

At step 1004, the decode unit 106 decodes the first instruction to identify particular bit patterns in the fetched instruction. Once the first instruction has been decoded the method 1000 proceeds to step 1006.

At step 1006, the decode unit 106 determines whether the first instruction is a postfix for another instruction. Determining whether the first instruction is a postfix for another instruction may comprise comparing the instruction to one or more predetermined bit patterns to determine if there is a match. For example, the decode unit 106 may determine the first instruction is a postfix instruction by analyzing the instruction's opcode. If the first instruction is determined to be a postfix then an error has occurred and at step 1008 the decode unit 106 invokes the exception handler unit 114. If, however, it is determined that the first instruction is not a postfix then the method 1000 proceeds to step 1010.

At step 1010, the decode unit 106 determines whether the first instruction is a base instruction (i.e. subject to modification by one or more other instructions). Determining whether the first instruction is a base instruction comprises analyzing the modifier bit(s) to determine if they have a predetermined bit pattern indicating that the instruction is a base instruction. If the first instruction is not a base instruction then at step 1012 the unmodified first instruction is dispatched to the execute unit 108 for execution. If, however, the decoded instruction is a base instruction the method 1000 proceeds to step 1014.

At step 1014, the decode unit 106 requests at least one additional instruction in the program. The additional instructions immediately follow the first instruction in the program. In cases where there can only be one postfix for any base instruction, then the decode unit 106 may only request one additional instruction. If, however, a base instruction can be modified by more than one postfix then the decode unit 106 may decode the modifier bits to determine the number of modifiers for the first instruction and the number of additional instructions requested is equal to the number of modifiers determined from the modifier bits. Once the additional instructions have been requested the method 1000 proceeds to step 1016.

Then at step 1016 the decode unit 106 receives and decodes the additional instructions. Once the next instruction has been received and decoded, the method 1000 proceeds to step 1018.

At step 1018, it is determined whether each of the additional instructions is a valid postfix for the first instruction. Determining whether an additional instruction is a valid postfix for the first instruction may comprise comparing the additional instruction to one or more predetermined bit patterns to determine if there is a match. If each of the additional instructions is a valid postfix for the first instruction then the method 1000 proceeds to step 1020. If, however, it is determined that at least one of the additional instructions is not a valid postfix then an error has occurred and at step 1008 the exception handler unit 114 is invoked.

At step 1020, the received and decoded postfix instruction(s) is/are used to modify the first instruction (i.e. the instruction received in step 1002) and in step 1022 the modified first instruction is sent to the execute unit 108 for execution.

The second and third embodiments described above, which involve fetching and decoding multiple consecutive instructions (i.e. fetching the preceding instruction to look for a prefix, or fetching the following instruction to look for a postfix), may be further enhanced by controlling the layout of instructions in the program memory 102. In particular, the program memory 102 may have fixed boundaries which can be expensive to cross. This can include, for example, cache line boundaries or transition page boundaries in the memory management unit (MMU). For example, the MMU page size may be 4K. It may therefore be undesirable to delay executing an instruction while waiting to fetch an instruction from across one of these boundaries, as it is much slower due to the cost of having to fetch an extra cache line or virtual memory page.

To address this, boundaries can be defined in the program memory 102 over which prefixing and/or postfixing are not allowed. Specifically, a prefix or postfix instructions should not be separated from their corresponding base instruction by such a boundary. This can avoid the cost of having to fetch an extra cache line or virtual memory page for checking a preceding or following instruction since it is known that it is not legal for a prefix or postfix to extend across the boundary. A compiler can deal with this exception by, for example inserting a No Operation (NOP) instruction, which is an instruction that effectively does nothing at all, in order to pad a prefix or postfix instruction from its base instruction so they do not straddle the boundary. Other, more sophisticated compilers may avoid the use of NOPs by reordering instructions. If the instruction set permits multiple prefixes or postfixes then the positioning would be limited so the whole group of prefixes and corresponding base, or postfixes and corresponding base, is not allowed to cross the boundary.

Figure 11:
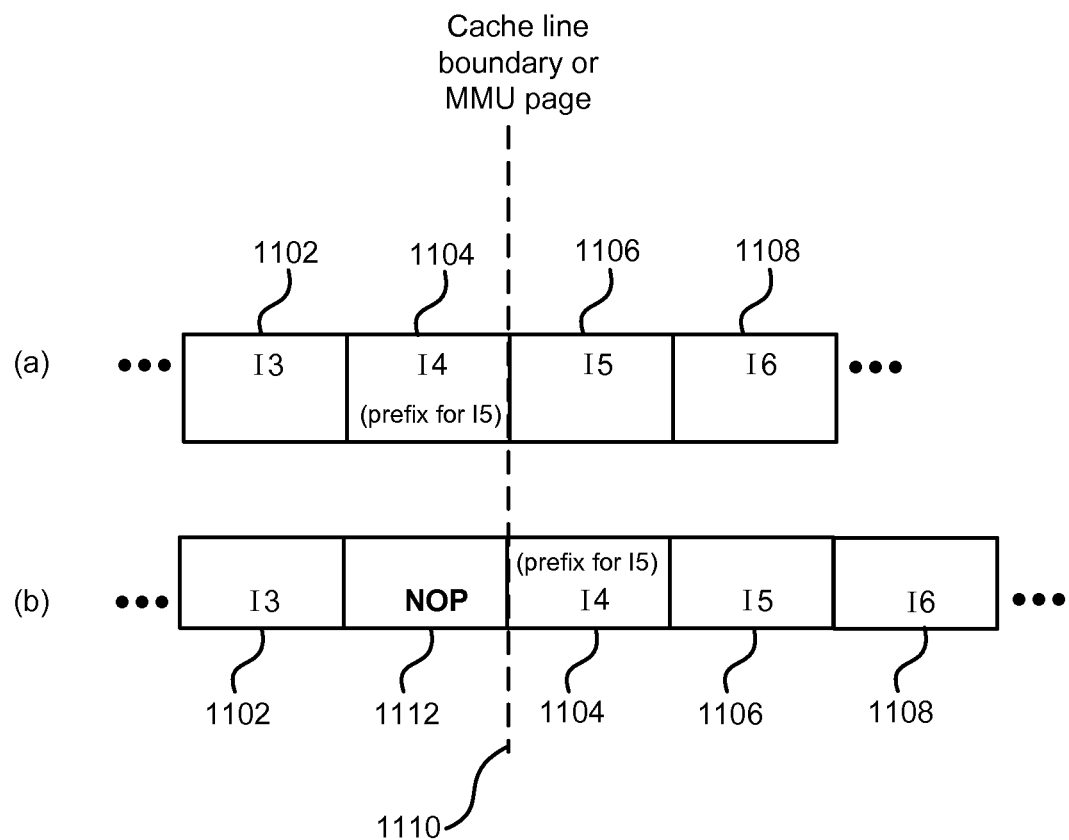
FIG. 11 shows an example of a method of arranging instructions in a program memory.

Reference is now made to FIG. 11 which illustrates the insertion of a NOP in a program to ensure that a postfix instruction and its corresponding base instruction do not straddle a boundary. In particular, as illustrated at (a) a program consists of four instructions 1102, 1104, 1106 and 1108. The instructions correspond to instructions I3, I4, I5 and I6 of FIG. 1 respectively where I4 is the prefix for I5 and I4 and I5 straddle a cache line 1110 boundary or an MMU page boundary. As illustrated at (b) in FIG. 11 an NOP 1112 is inserted between I3 and I4 so that I4 is pushed to the other side of the boundary 1110 so that the prefix I4 and its base instruction I5 are on the same side of the boundary 1110.

The method described in reference to FIG. 11 may be executed by a compiler or similar device.

Another example includes a non-transitory computer readable storage medium having stored thereon computer readable instructions that, when processed at a computer system for generating a manifestation of an integrated circuit, cause the computer system to generate a manifestation of an integrated circuit to perform the method of: receiving a first instruction; determining if the first instruction was invoked by a non-incremental change to a program counter; in response to determining the first instruction was invoked by a non-incremental change to the program counter, requesting a second instruction, the second instruction being an instruction immediately preceding the first instruction in a computer program; receiving the second instruction; analyzing the second instruction to determine if the first instruction is a base instruction; and in response to determining the first instruction is a base instruction, invoking exception handling code.

A further example includes a non-transitory computer readable storage medium having stored thereon computer readable instructions that, when processed at a computer system for generating a manifestation of an integrated circuit, cause the computer system to generate a manifestation of an integrated circuit to perform the method of: receiving an instruction, the instruction comprising at least one modifier bit, the at least one modifier bit indicating whether the instruction is a base instruction, a base instruction being an instruction subject to modification by one or more other instructions; analyzing the at least one modifier bit to determine if the received instruction is a base instruction; in response to determining that the received instruction is not a base instruction, determining if the received instruction is a prefix instruction, a prefix instruction being an instruction that modifies a subsequent instruction; in response to determining the received instruction is a prefix instruction, storing the received instruction; in response to determining that the received instruction is a base instruction, determining if there are a predetermined number of stored prefix instructions for the base instruction; and in response to determining that there are not the predetermined number of stored prefix instructions for the base instruction, invoking exception handling code.

Yet another example includes a non-transitory computer readable storage medium having stored thereon computer readable instructions that, when processed at a computer system for generating a manifestation of an integrated circuit, cause the computer system to generate a manifestation of an integrated circuit to perform the method of: receiving a first instruction; determining whether the first instruction is a postfix instruction, a postfix instruction being an instruction that modifies a preceding instruction; in response to determining the first instruction is a postfix instruction, determining whether the first instruction was invoked by a non-incremental change to a program counter; and in response to determining the first instruction was invoked by a non-incremental change to the program counter, invoking exception handling code.

One of the effects of the embodiments described above is a more efficient computer. Specifically, by enabling the data processing apparatus to more quickly and efficiently identify illegal jumps the apparatus does not have to waste resources executing erroneous code.

A further effect of the embodiments described above is the use of static analysis (also called static code analysis or SCA). This is an automated program analysis performed on the source or object code, without executing the program. Because it is performed without execution, static analysis must consider every possible outcome of a branch in the program. This results in many permutations, and the analysis quickly becomes complex and slow. Because the methods described above eliminate certain branch destinations as illegal (because they branch to the wrong part of an instruction or modifier), this cuts down on the number of branch permutations that the static analysis need to consider. As a result, the static analysis speed is increased.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A method of storing a computer program in a program memory, the computer program comprising a plurality of instructions, the method comprising:

receiving the plurality of instructions at a compiler, the plurality of instructions comprising one or more base instructions and at least one modifier instruction for each base instruction;

analyzing, at the compiler, the plurality of instructions to identify each base instruction and the at least one modifier instruction for each identified base instruction; and storing each identified base instruction on a same side of a boundary within the program memory as the at least one modifier instruction for that identified base instruction, wherein the storing each identified base instruction on the same side of a boundary within the program memory as the at least one modifier instruction for that identified base instruction comprises reordering the plurality of instructions so that each identified base instruction is stored on the same side of a boundary within the program memory as the at leak one modifier instruction for that identified base instruction.

2. The method of claim 1, wherein a boundary within the program memory comprises one or more of a beginning of a cache line, an end of a cache line and a memory management unit page.

3. The method of claim 1, wherein each modifier instruction is a postfix instruction.

4. The method of claim 1, each modifier instruction is a prefix instruction.

5. The method of claim 1, wherein storing an identified base instruction on the same side of a boundary within the program memory as the at least one modifier instruction for that base instruction comprises inserting one or more No Operation instructions in the computer program before the identified base instruction or the at least one modifier instruction for the identified base instruction so that the identified base instruction and the at least one modifier instruction for that identified base instruction are stored on the same side of a boundary within the program memory.

6. The method of claim 1, wherein the plurality of instructions comprises at least two modifier instructions for a base instruction, the method further comprising storing the base instruction on the same side of a boundary of the program memory as the at least two modifier instructions for that base instruction.

7. A device arranged to store a computer program, the computer program comprising a plurality of instructions, the device comprising:
    a program memory; and
    a processor configured to:
        receive the plurality of instructions, the plurality of instructions comprising one or more base instructions and at least one modifier instruction for each base instruction,
        analyze the plurality of instructions to identify each base instruction and the at least one modifier instruction for each identified base instruction, and
        store each identified base instruction on a same side of a boundary within the program memory as the at least one modifier instruction for that identified base instruction wherein the processor is configured to store each identified base instruction on the same side of a boundary within the program memory as the at least one modifier instruction for that identified base instruction by reordering the plurality of instructions so that each identified instruction is stored on the same side of a boundary within the program memory as the at least one modifier instruction for that identified base instruction.

8. The device of claim 7, wherein a boundary within the program memory comprises one or more of a beginning of a cache line, an end of a cache line and a memory management unit page.

9. The device of claim 7, wherein each modifier instruction is a postfix instruction.

10. The device of claim 7, wherein each modifier instruction is a prefix instruction.

11. The device of claim 7, wherein the processor is configured to store an identified base instruction on the same side of a boundary within the program memory as the at least one modifier instruction for that identified base instruction by inserting one or more No Operation instructions in the computer program before the identified base instruction or the at least one modifier instruction for the identified base instruction so that the identified base instruction and the at least one modifier instruction for that base instruction are stored on the same side of a boundary within the program memory.

12. The device of claim 7, wherein the plurality of instructions comprises at least two modifier instructions for a base instruction, and the processor is configured to store that base instruction on the same side of a boundary of the program memory as the at least two modifier instructions for that base instruction.

13. A data processing apparatus arranged to execute a computer program, the data processing apparatus comprising:
    a program memory configured to store the computer program, the computer program comprising a plurality of instructions, the plurality of instructions comprising one or more base instructions and at least one modifier instruction for each base instruction, the plurality of instructions stored in the program memory so that each base instruction is stored on a same side of a boundary within the program memory as the at least one modifier instruction for that base instruction;
    a program counter configured to identify a first instruction in the program memory;
    a fetch unit configured to retrieve the first instruction in the program memory identified by the program counter; and
    a decode unit configured to:
        receive the first instruction from the fetch unit, and
        request an additional instruction from the fetch unit to look for a modifier instruction for the first instruction, the additional instruction being an instruction immediately preceding the first instruction in the program memory or an instruction immediately following the first instruction in the program memory;
    wherein the fetch unit is further configured to determine whether the additional instruction is on the same side of a boundary of the program memory as the first instruction, and in response to determining that the additional instruction is not on the same side of the boundary of the program memory, avoid fetching the additional instruction from the program memory.

\* \* \* \* \*